United States Patent
Regnell et al.

(10) Patent No.: US 7,530,612 B2
(45) Date of Patent: May 12, 2009

(54) UNDERRUN PROTECTION DEVICE

(75) Inventors: Hans Regnell, Ytterby (SE); Jens Gustafsson, Göteborg (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 10/710,118

(22) Filed: Jun. 18, 2004

(65) Prior Publication Data

US 2005/0017519 A1 Jan. 27, 2005

Related U.S. Application Data

(63) Continuation of application No. PCT/SE02/01976, filed on Oct. 30, 2002, now abandoned.

(30) Foreign Application Priority Data

Dec. 21, 2001 (SE) .................... 0104419

(51) Int. Cl.
*B60R 19/02* (2006.01)
(52) U.S. Cl. .................... 293/118; 293/119
(58) Field of Classification Search .............. 293/102, 293/103, 118, 119
See application file for complete search history.

(56) References Cited

U.S. PATENT DOCUMENTS

| | | | | |
|---|---|---|---|---|
| 1,646,055 A | * | 10/1927 | Ebaugh | 293/119 |
| 4,105,237 A | | 8/1978 | Viall, Sr. et al. | |
| 4,138,152 A | * | 2/1979 | Prue | 293/117 |
| 4,247,138 A | * | 1/1981 | Child | 293/103 |
| 4,514,002 A | | 4/1985 | McIntosh | |
| 6,142,542 A | * | 11/2000 | Sherno | 293/132 |

FOREIGN PATENT DOCUMENTS

| | | |
|---|---|---|
| DE | 2832250 A1 | 1/1980 |
| DE | 259822 A1 | 9/1988 |
| DE | 4103782 C2 | 8/1992 |
| EP | 0589227 A1 | 3/1994 |
| EP | 0917933 A2 | 5/1999 |
| JP | 05-13861 U | 10/2000 |

* cited by examiner

*Primary Examiner*—Stephen Gordon
(74) *Attorney, Agent, or Firm*—Novak Druce + Quigg, LLP

(57) ABSTRACT

Method and arrangement for moving an underrun protection device for vehicles having a frame (3), an impact element (7) arranged on the vehicle at a location corresponding to an expected loading from a force during a possible collision, and at least one displaceable carrier element (6) connecting the frame (3) and the impact element (7). During displacement of the impact element (7) between at least one first, active position and at least one second, inactive position, at least a part of the displacement occurs in a direction that substantially coincides with a longitudinal axis of the carrier (6).

33 Claims, 7 Drawing Sheets

UNDERRUN PROTECTION DEVICE

CROSS-REFERENCE TO RELATED APPLICATIONS

The present application is a continuation patent application of International Application No. PCT/SE02/01976 filed 30 Oct. 2002 which was published in English pursuant to Article 21(2) of the Patent Cooperation Treaty, and which claims priority to both Swedish Application No. 0104419-7 filed Dec. 21, 2001. Said applications are expressly incorporated herein by reference in their entireties.

TECHNICAL FIELD

The current invention relates to a method for maneuvering an underrun protection device and an arrangement for an underrun protection (also known as run-under protection) device for a vehicle. The main area of application for the invention is heavy trucks, especially for the purpose of preventing passenger vehicles from penetrating under a truck during a collision.

BACKGROUND ART

Large vehicles, such as trucks, are currently designed with a relatively large road clearance. One major reason for this is the need for using the vehicle for driving over rough terrain. At the front of the vehicle, the road clearance is normally on the order of 40-50 cm.

The fact that a truck normally has a relatively large road clearance constitutes a serious risk with respect to road traffic safety. The reason for this is that during a collision between such a truck and a passenger vehicle there is a risk that the passenger vehicle will penetrate in under (run under) the front or rear part of the truck and thus be jammed between the road surface and the underside of the frame or load carrier of the vehicle. The result may be that the rear part of the truck will enter the passenger compartment of the vehicle with great force, which in turn may cause serious injuries to the passengers of the vehicle. One purpose of an underrun protection device of this type is to prevent a vehicle from coming into contact with the frame during a collision event.

A further purpose is that the underrun protection device allows the normal zones of deformation of the colliding vehicle to be utilized.

Different solutions have been developed to solve the above problem. It is on one hand possible to design the truck with a lowered front or rear section, for instance, a rear section with a road clearance that is so low that there is no room for a passenger vehicle to penetrate in under the truck and be jammed between the truck and the road surface. Such a solution is, however, contrary to the above-mentioned desire for a large road clearance to facilitate driving over rough terrain. Hence, lowering the road clearance is therefore ruled out for many types of trucks.

A further solution to the problem in question is to provide the truck with a particular underrun protection device in the form of a reinforced structure, for instance in the shape of a horizontally arranged beam element at the rear section of the truck. By means of such an element it is possible to prevent a passenger vehicle from penetrating in under a front or rear section of a truck.

Such a reinforced structure may in addition be arranged to be energy absorbing so that the structure absorbs energy under load. This will further reduce the risk of serious injuries in a possible collision.

A known underrun protection device for trucks is disclosed in the German patent document DE4103782 C2. This underrun protection device includes a shock-absorbing element arranged under the front bumper of the truck. The shock-absorbing element can be set at a predetermined angle relative to the road surface. In the event of a collision with a passenger vehicle, the bumper will be acted on by a predetermined force which will cause a linkage to pivot the shock-absorbing element into a position preventing the passenger vehicle from penetrating under the truck.

Although this known design in principle gives a good protection against underrun for the passenger vehicle, it does have a disadvantage in that it requires a large number of moving parts, making it unnecessarily complicated and creating a risk of loss of function. Also, this solution gives little possibility for controlling the energy absorption in a controlled manner during a collision.

A further known underrun protection device for vehicles is known from the patent document DD 259 822. This system discloses two substantially S-shaped dampening elements, which are deformable and arranged between a spring attachment point on the vehicle and an underrun protection device. The dampening elements will deform under load in order to absorb force.

A further known underrun protection device for a vehicle is shown in the patent document EP 0 917 933. This document discloses a rear underrun protection device having a pair of load carrying elements with a fold-away section. This solution allows a deformation element to be partially folded away.

All the above documents show solutions in which a deformation element can be partially folded away. The problem with these types of underrun protection devices, however, is that they may obstruct a hook when connecting a trailer, or they may catch during a reversing operation towards an edge or a loading bay.

Hence, there is a need for an arrangement for providing underrun protection that when the need arises for increased road clearance, or connecting of trailers or similar components, the arrangement may be folded completely away, or at least almost completely away, while at the same time providing full protection against run-under by other vehicles during a collision.

DISCLOSURE OF INVENTION

A purpose of the current invention is to provide an improved underrun protection device for trucks that gives a secure function, that fulfils set requirements for energy absorption, and that may be completely or at least almost completely folded away.

The present invention is intended for implementation on vehicles comprising (including, but not limited to) a frame. An impact element is arranged on the vehicle at a location corresponding to an expected loading from a force during a possible collision, and at least one displaceable carrier element connecting the frame and the impact element. The impact element is preferably energy absorbing. The inventive idea is that during displacement of the impact element between a first, active position and a second, inactive position, at least a part of the displacement occurs in a direction that substantially coincides with the longitudinal direction of the carrying element.

The term "active position" indicates that the impact element is in a folded down, force absorbing position, while the term "inactive position" indicates a completely or almost completely folded away position.

According to a first embodiment, the displacement may comprise a first, pivoting movement around a pivoting axis, followed by a second displacing movement in a direction substantially coinciding with the longitudinal axis of the carrier.

According to a second embodiment the displacement may comprise a first, pivoting movement around a pivoting axis, followed by a second displacing movement in a direction substantially coinciding with the longitudinal axis of the carrier.

The invention also relates to an arrangement for underrun protection for frame-based vehicles and having an impact element arranged on the vehicle at a location corresponding to an expected loading from a force during a collision. At least one displaceable carrying element is provided that connects the frame and the impact element. The arrangement has the characteristic that the carrier is displaceably mounted to an attachment device at the frame, and is displaceable between a first, active position and a second, inactive position, whereby at least a part of the displacement occurs in a direction that substantially coincides with the longitudinal direction of the carrying element.

According to a preferred embodiment, the device is provided with a carrier on either side of the frame of the vehicle. In the following text, however, the arrangement of the invention is described for one side of the vehicle only, unless otherwise specified.

According to the invention, the attachment device comprises at least one first guiding means to control the movement of the carrier, which means is arranged to cooperate with at least one co-operating second guiding means on the carrier.

The first embodiment is characterized in that the attachment device, apart from the respective first and second guiding means, comprises a third guiding means. The third guiding means is in the form of a pivoting axis that allows the carrier to be pivoted from the first position to an intermediate position, and from which the carrier is displaceable along its longitudinal axis to the second position. The initial pivoting movement may be made either in a forward or a rearward direction in rotation to the main direction of movement of the vehicle.

The direction is dependent on the design of the mechanism, the desired function(s), and whether the underrun protection device is located at the front or rear of the vehicle. The various embodiments will be described in detail below in connection with the attached drawing figures.

The respective first and second guiding means preferably comprise a first guiding slot and a guide co-operating with the guiding slot. These may for instance comprise a cylindrical projection that moves between a pair of opposing parallel guide surfaces in which the width of the guiding slot substantially corresponds to the diameter of the projection. According to a preferred embodiment, the guide is attached to the carrier, while the guiding slot is arranged on or connected to the frame.

Other arrangements are of course possible for achieving the control of the displacement of the carrier. Examples may be a first guiding means in the shape of a pair of rotatable elements or rollers co-operating with a second guiding means in the shape of a ridge or a profile placed between a pair of such elements.

Correspondingly, the pivoting axis may cooperate with a further fourth guiding means which comprises a substantially straight, second guiding slot placed in the carrier. In this case, the pivoting axis is used as a guiding means, the diameter of which substantially corresponds to the width of the guiding slot.

According to this embodiment, the pivoting axis is fixedly mounted relative to the frame of the vehicle so that the guiding slot allows the carrier to be relatively displaced.

In order to achieve the desired combination of a pivoting movement and a displacement of the carrier the first guiding slot may be have a number of different embodiments. According to one embodiment, the first guiding slot has a first, straight section and a second, curved section with a predetermined continuous curvature. According to an alternative embodiment, the first guiding slot has a first, curved section with a predetermined continuous curvature and a second, straight section. According to a further alternative embodiment, the first guiding slot has a first, straight section, a second, curved section with a predetermined continuous curvature and a third, straight section. In all cases mentioned above in which the pivoting axis is mounted fixed relative to the frame, the curved section has a radius corresponding to the distance between the guide and the pivoting axis. The distance is preferably measured at right angles to the pivoting axis when the guide is located in any part of the curved section. A characterizing feature of the above examples is that the longitudinal axes of the first and the second guiding slots coincide or are parallel during displacement of the carrier.

An alternative first embodiment is characterized in that the attachment device comprises a third guiding means, in addition to the first and second means respectively. The third means has a pivoting axis that allows the carrier to be pivoted from the first position to an intermediate position, whereby the pivoting axis is displaceable to the second position substantially along the longitudinal axis of the frame. The initial pivoting movement may be made either in a forward or a rearward direction in relation to the main direction of movement of the vehicle. According to this embodiment, the end of the carrier facing the vehicle is mounted directly to the pivoting axis. If the design of the frame or various accessories mounted to the frame causes a limitation of the displaceable distance of the pivoting axis, the axis may be provided with a holder that allows an additional longitudinal displacement of the carrier. Such holders are described below.

A further alternative embodiment is characterized in that the attachment device comprises a third guiding means, in addition to the first and second means respectively. The third means has a pivoting axis that allows a holder attached at the pivoting axis to be pivoted. The carrier is supported by and displaceable relative to the holder. The holder comprises the first guiding means having inner and outer guiding surfaces respectively, which surfaces co-operates with the second guiding means having corresponding outer and inner guiding surfaces respectively on the carrier. A holder having inner guiding surfaces may be arranged to enclose a carrier with outer guiding surfaces partially or completely. A holder with outer guiding surfaces may instead cooperate with inner guiding surfaces, such as rollers or tracks on the carrier.

According to the third embodiment, the attachment device may comprise a third guiding means having a pivoting axis that allows the carrier to be pivoted. In this way, the carrier is displaceable along its longitudinal axis from the first position to an intermediate position, and thereafter pivotable to the second position.

According to a further preferred embodiment, the pivoting axis may cooperate with a further, fourth guiding means, comprising a substantially straight, second guiding slot in the carrier. The first guiding slot is preferably placed at or in connection to the frame and may be shaped as a straight section, a continuously curved section, or a combination of straight and curved sections.

A characterizing feature of the above examples having straight sections is that the longitudinal axes of the first and the second guiding slots neither coincide nor are parallel during displacement of the carrier.

As stated above, other arrangements than the combination guide and guiding slot are possible for controlling the movement of the carrier, and the invention is not limited to these.

In the above described embodiments, the carriers may be displaced to an inactive position where the impact element is placed in direct or close proximity to the frame, either behind or below it.

In addition, certain embodiments may be arranged to assume further inactive or active positions. For example, the above mentioned second embodiment may be arranged to allow the carrier to be pivoted both forwards and backwards in relation to the main direction of movement of the vehicle, whereby the impact element may assume a first inactive position under the frame or a second inactive position behind the frame. The end position may be chosen dependent on the field of operation of the vehicle, or how far the impact element is required to be folded in order to perform a specific task. Examples of such tasks may be reversing up to a loading bay or connecting a trailer. Also, the above mentioned intermediate positions, or other positions between the active and inactive positions, may under certain conditions be used as alternative inactive positions. These positions may be used when a partially folded position is sufficient to allow a task to be performed.

Further active positions are possible for instance for adapting the vehicle to different markets, as the legislated road clearance of the impact element may vary from country to country. If an impact element for a front underrun protection device is used as an attachment point for a spoiler, different active positions may be used to control the road clearance of the spoiler at different speeds. Naturally, the upper and lower positions of the element must conform to current legislation in the country in question.

According to an alternative embodiment the carriers may be positioned in a second, inactive position. In this position the respective carrier, including the impact element, is placed alongside and substantially parallel to a section of the frame along the entire length of the carrier.

This is achieved by allowing the impact element to be divided in two sections along its main longitudinal direction at a point that coincides with the central longitudinal axis of the frame.

The division of the impact element may be achieved by providing each section with a further, second dividing point, which substantially coincides with a line through each respective carrier. Each section comprises inner and outer parts pivotably connected at the second dividing point, whereby the inner part may be folded into a position completely or substantially parallel to the outer part.

The inner part may preferably be folded around a vertical axis.

Alternatively, the respective sections may be divided by providing the inner parts with a cross-section that is somewhat smaller than the corresponding outer parts, which allows the inner part to be telescopically displaced into the outer part.

In this way it is possible to fold away either one or both carriers with their respective impact element, as the arrangement allows the carriers to be displaced one at the time.

The carriers may be maneuvered either manually or by means of actuators for moving these between the first, active position and the second, inactive position and vice versa. The actuators may have conventional electrical, hydraulic or pneumatic cylinders or motors. These may be placed on one side of the frame, for simultaneous maneuvering of both carriers, or on both sides of the frame, for simultaneous or individual maneuvering of the carriers. Actuators comprising hydraulic or pneumatic cylinders are preferably pivotably or fixedly attached to the frame at a first end and pivotably attached to the carrier at a second, opposite end.

The actuators may also be arranged to move the carriers automatically from the first, active position and the second, inactive position when certain predetermined conditions are met. One such condition may be that a tilting function on a vehicle provided with a loading plank is actuated. The underrun protection device may then be folded away so that it does not obstruct the tilting loading platform or sliding soil filling material.

In a corresponding way, the actuators may be arranged to move the carriers automatically from the second, inactive position and the first, active position when certain predetermined conditions are met. One such condition may be that the speed of the vehicle exceeds a predetermined value. If the underrun protection device has been folded away to allow driving on a building site that requires an increased road clearance, there is a risk that the driver may forget to fold it down when leaving the site. By selecting a suitable limit value for speed, alternatively combined with a period of time during which the speed must exceed the limit value, the underrun protection device may resume its active position by automatic actuation of an actuator. These and other desired conditions may be programmed into an existing central control unit in the vehicle.

If the device is to be maneuvered manually, the mechanism should be provided with latches in some form, at least in each end position.

BRIEF DESCRIPTION OF THE DRAWINGS

In the following text, the invention will be described relating to a number of embodiments and with reference to the attached schematic drawings, in which.

MODE FOR THE INVENTION

Figure 1:
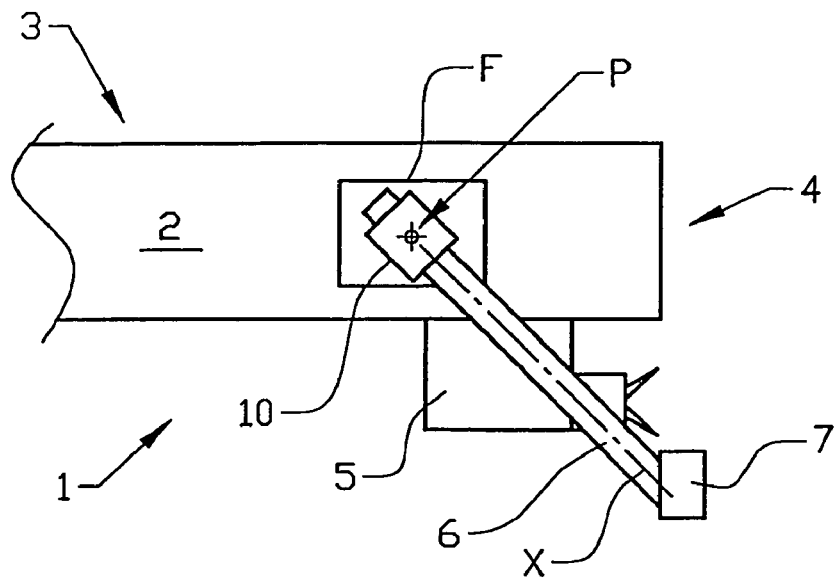
FIG. 1 shows a side view of a first embodiment of the invention, with the underrun protection device in an active position.

FIG. 1 shows a side view of a first embodiment according to the invention where a frame for a vehicle, which frame 1 has at least one longitudinal section 2, 3 (only one is shown) and a rear transverse section 4, has been provided with an underrun protection device. In the figure, the underrun protection device is shown in a folded down, active position where it may prevent access to a coupling for a trailer, which coupling is mounted under the frame, as well as reduce the road clearance of the vehicle. In the text below the design of the underrun protection device will be described for one side of the frame 2, unless stated otherwise. All directional references are given in the main direction of movement of the vehicle. The underrun protection device comprises a carrier 6 provided with a transverse impact element 7. The impact element 7 is mounted on at least two carriers 6, placed on either side of the frame, and is positioned slightly behind and below the frame 1.

Figure 2:
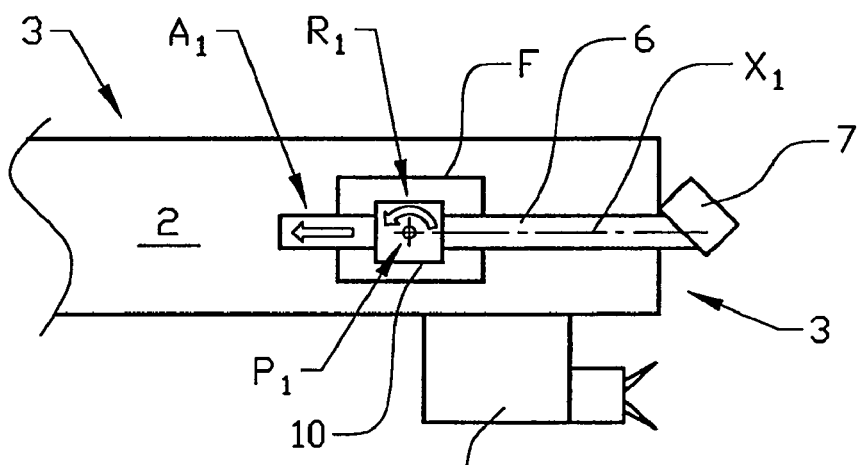
FIG. 2 shows a side view of the first embodiment of the invention, with the underrun protection device in an inactive position.

FIG. 2 shows a side view of a second embodiment of the invention.

According to this embodiment, the attachment device, F, is provided with a holder 10 that is pivotable relative to the attachment device around a pivoting axis, P. The carrier 6 is displaceable relative to the holder 10, which comprises guiding surfaces enclosing the carrier 6 and co-operates with corresponding guiding surfaces on the carrier. The figure shows the impact element in its active position.

The guiding surfaces will not be described in detail in this application. These surfaces may preferably have co-operating flat or profiled surfaces or guides, or alternatively a number of cylindrical or profiled rollers running along co-operating guides. The guiding surfaces on a guiding or a guided part respectively, may be placed facing each other or facing away from each other respectively, or vice versa.

FIG. 2 shows a first method of folding away the underrun protection device according to the first embodiment. According to this method the carrier 6 is first pivoted from its active position, as shown in FIG. 1, in a direction upwards and backwards, as indicated by the arrow $R_1$, to an intermediate position corresponding to a substantially horizontal position. From this intermediate position the carrier 6 is displaced forward relative to the frame 1, as indicated by the arrow $A_1$, until the impact element 7 comes into contact with the rear section 4 of the frame 1. The underrun protection device is then in its inactive position. Folding the underrun protection device to its active position is performed in reverse order.

Figure 3:
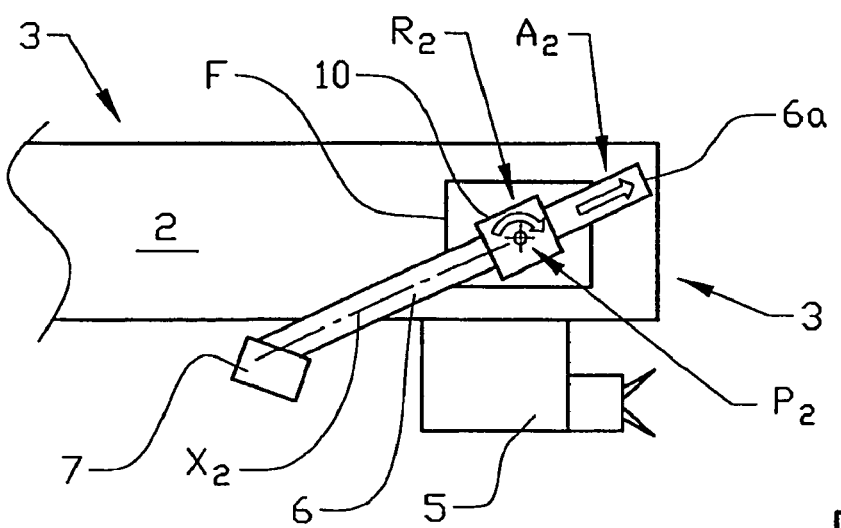
FIG. 3 shows a side view of a second version of the second embodiment of the invention, with the underrun protection device in an inactive position.

FIG. 3 shows a second method for folding away the underrun protection device according to the first embodiment. According to this method the carrier 6 is first pivoted from its active position, as shown in FIG. 1, in a direction forwards and upwards, as indicated by the arrow $R_2$, to an intermediate position where the carrier assumes an angled position obliquely under the frame 1. From this intermediate position, the carrier 6 is displaced obliquely backwards and upwards relative to the frame 1 as indicated by the arrow $A_2$ until the impact element comes into contact with the underside of the frame 1. The underrun protection device is then in its inactive position.

The angle of the carrier 6 relative to the longitudinal axis of the frame should be selected so that first, from the impact element 7 facing end 6a does not extend past either of the upper or rear limiting surfaces of the frame 1. The underrun protection device is then in its inactive position.

The embodiments of FIGS. 2 and 3 may be combined to allow the impact element to be folded in either direction. In this way the driver may choose an inactive position depending on how the vehicle is to be used or which action the driver intends to perform. In order to connect a trailer, it may suffice to fold the carrier 6 into the position shown in FIG. 2, while the position shown in FIG. 3 may be required to allow the vehicle to be reversed all the way into a loading bay or similar location.

Figure 4:
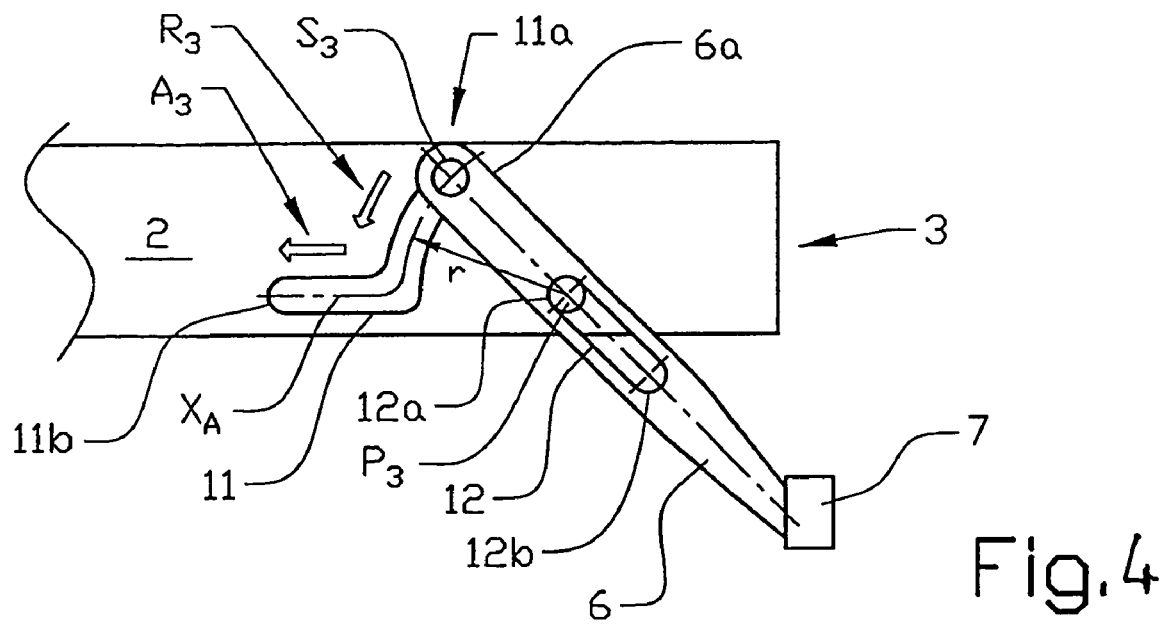
FIG. 4 shows a side view of a third version of the second embodiment of the invention, with the underrun protection device in an active position.

FIG. 4 shows a third method of folding the underrun protection device according to the first embodiment. According to this method the longitudinal section 2 of the frame is provided with a first guiding means in the form of a first guiding slot 11. This guiding slot 11 co-operates with a second guiding means in the form of a pin $S_3$ attached to the carrier at its first, from the impact element 7 facing end 6a. The longitudinal section 2 of the frame is also provided with a third guiding means in the form of a pivoting axis $P_3$, which is a pivoting point for the carrier 6. This pivoting axis $P_3$ co-operates with a fourth guiding means comprising a substantially straight, second guiding slot 12. FIG. 4 shows the underrun protection device in its folded down active position. When moved to its inactive position, the carrier 6 is pivoted upwards and rearwards around the pivoting axis $P_3$, as indicated by the arrow $R_3$, to an intermediate position corresponding to a substantial horizontal position. During this rotation the pin $S_3$ is moved from a first end position 11a through a curved section of the first guiding slot 11. The radius r of the curved section corresponds to the distance between the pivoting axis $P_3$ and the pin $S_3$. From the intermediate position the carrier can be displaced along its and the longitudinal axis $X_B$ of the second guiding slot 12, parallel to the longitudinal section 2 of the frame, until the impact element 7 comes into with the rear section 4 of the frame 1. During this-movement the pin $S_3$ is displaced to a second end position 11b through a straight section of the first guiding slot 11, as indicated by the arrow $A_3$. At the same time the guiding slot 12 in the carrier 6 is displaced relative to the pivoting axis. During this displacement, a longitudinal axis $X_A$ of the straight section of the first guiding slot 11 coincides with the axis $X_B$ of the second guiding slot 12. The underrun protection device is then in its inactive position.

The guiding slot 11 of FIG. 4 may of course be given other shapes within the scope of the invention. For instance, the guiding slot may be given a first straight component in the direction of the carrier, followed by a second curved and a finishing straight, horizontal section as described above. It is also possible to provide the straight finishing section a short vertical section adjacent the second end position, in order to lock the carrier in its inactive position.

Figure 5:
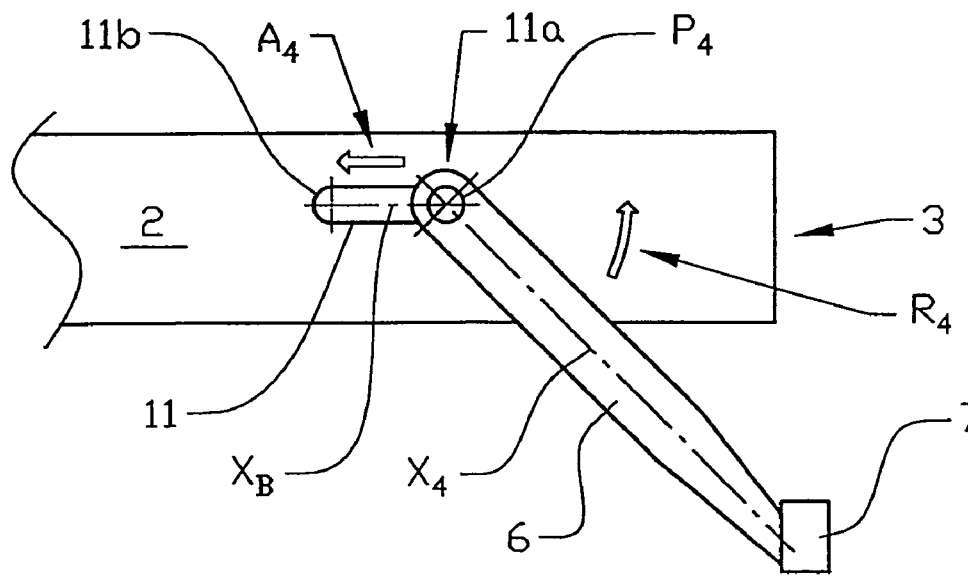
FIG. 5 shows a side view of a fourth version of the second embodiment of the invention, with the underrun protection device in an active position.

FIG. 5 shows a fourth method of folding the underrun protection device according to the second embodiment. According to this method the carrier 6 is first pivoted from its active position backwards and upwards, as indicated by the arrow $R_4$, to an intermediate position corresponding to a substantially horizontal position. This rotation occurs around a pivoting axis $P_4$ attached to the carrier 6. From this intermediate position the carrier 6 is displaced forwards relative to the frame 1, as indicated by the arrow $A_4$, until the impact element 7 comes into contact with the rear section 4 of the frame 1. During this movement the pivoting axis $P_4$ is displaced in a guiding slot 11 in the longitudinal section 2 of the frame, from a first end position 11a to a second end position 11b. The guiding slot comprises a straight section with a longitudinal axis $X_B$, which coincides with the longitudinal axis $X_4$ of the carrier during the displacement of the carrier. The underrun protection device is then in its inactive position.

A version of the embodiment according to FIG. 5 may also be folded away as described in connection with FIG. 3. In this case the carrier would be rotated forwards to an intermediate position, where its longitudinal axis has assumed substantially the same angle relative to the frame as shown in FIG. 3. In this intermediate position the longitudinal axis of the carrier will coincide with the longitudinal axis of a guiding slot in the longitudinal section of the frame, whereby the carrier can be displaced obliquely upwards until the impact element comes into contact with the underside of the frame.

Under certain conditions it is sufficient to perform the folding to the intermediate position, in order to allow the driver to perform the action that gave rise to the folding operation. In such cases the intermediate position is an alternative inactive position. If any form of actuator is used, the carriers 6 may be locked in further inactive positions dependent on the cause of the folding operation.

In addition, a third embodiment of the invention can be illustrated by FIG. 2.

According to this method the carrier 6 is first displaced from its active position, as shown in FIG. 1, obliquely forwards and upwards relative to the frame 1, as indicated by the arrow $A_1$, to an intermediate position. From this intermediate position the carrier is pivoted backwards and upwards, as indicated by the arrow $R_1$, until the impact element reaches a substantially horizontal position relative to the rear section 4 of the frame 1. The underrun protection device is then in its inactive position.

This third embodiment can also be achieved by means of guides and guiding slots. One such solution (not shown) comprises a carrier with a guiding slot, as described in connection with FIG. 4; which guiding slot is placed near the first end of the carrier and co-operates with a pivoting axis attached to the frame. The outer part of the first end of the carrier is also provided with a guide, which co-operates with a guiding slot arranged on the frame. The main difference between this embodiment and that according to FIG. 4 is the shape of the guiding slot of the frame. This slot would comprise a first straight section, having the same direction as the carrier, and a second section curved forwards and downwards.

Figure 6:
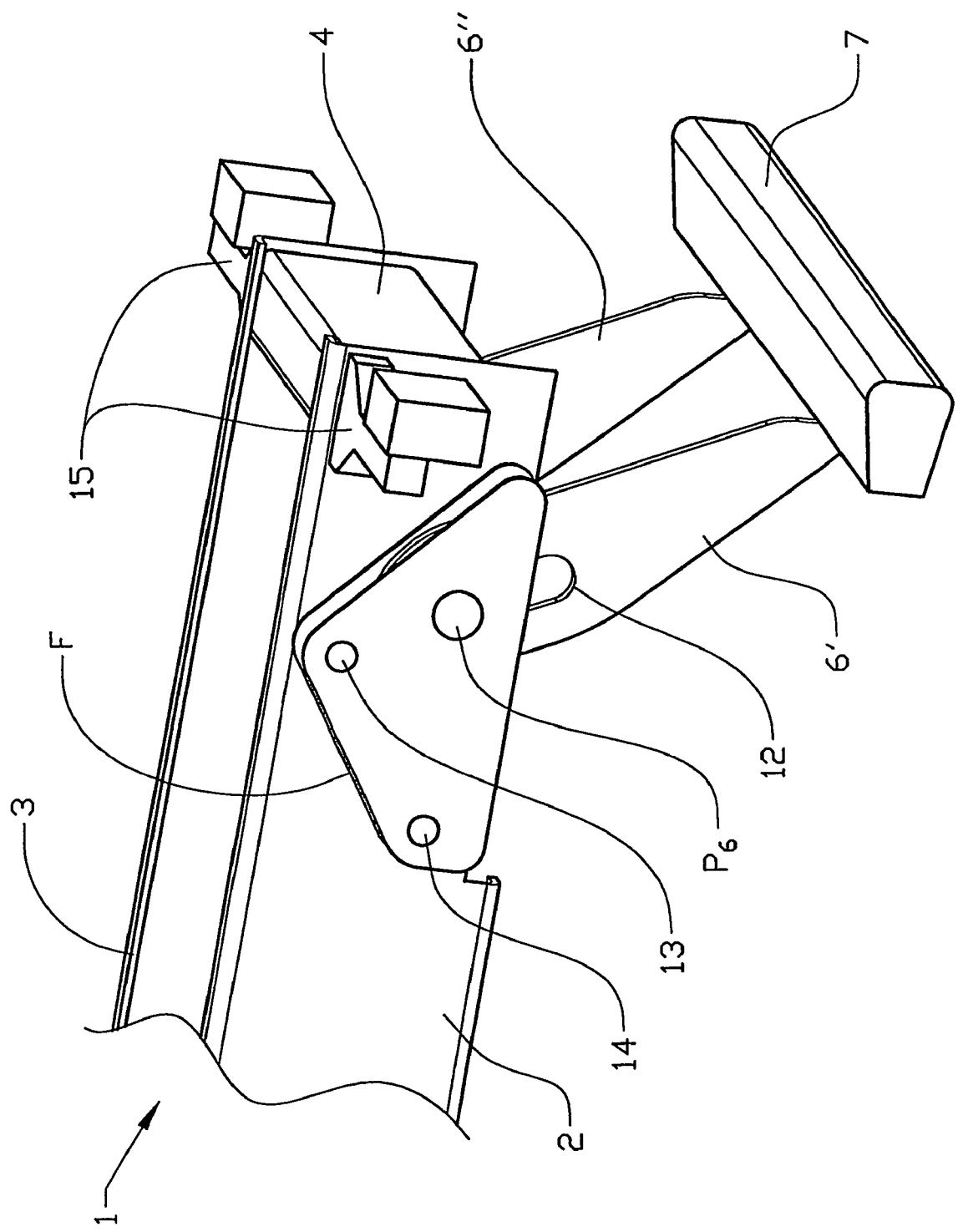
FIG. 6 shows a perspective view of a frame provided with an underrun protection device configured according to the teachings of the present invention deployed in an active position.

FIG. 6 shows a perspective view of a vehicle frame provided with an under-run protection device according to the invention. The frame 1 of the vehicle comprises two beams 2, 3, the rear end of which are connected by a rear section 4 in the form of a transverse beam. An attachment device F is mounted on the outer sides of the respective beams 2, 3. The attachment devices F are each provided with a carrier 6', 6", which carriers are connected by a transverse impact element 7. Each carrier 6', 6" is pivotable around a pivoting point in the form of a pivoting axis P6 mounted on each respective attachment device. The carriers 6', 6" are also provided with a guiding slot 12 in which the pivoting axis $P_6$ is arranged. The guiding slot 12 has the shape of a closed profile having two parallel guiding surfaces and a pair of semi-circular end surfaces. The attachment device F is also provided with a pair of first and second blocking devices 13 and 14 respectively, in the form of bolts or similar, defining the respective active and inactive positions of the carrier 6.

The attachment device F itself comprises two parallel plates mounted on either side of the carrier 6', 6". The pivoting axis $P_6$ and the blocking devices 13, 14 are mounted through the device and also act as spacers for the plates. The outer plate acts as a protective cover, which on one hand protects the mechanism from dirt and various penetrating objects, and on the other hand minimizes the risk of injury to an operator.

Figure 7:
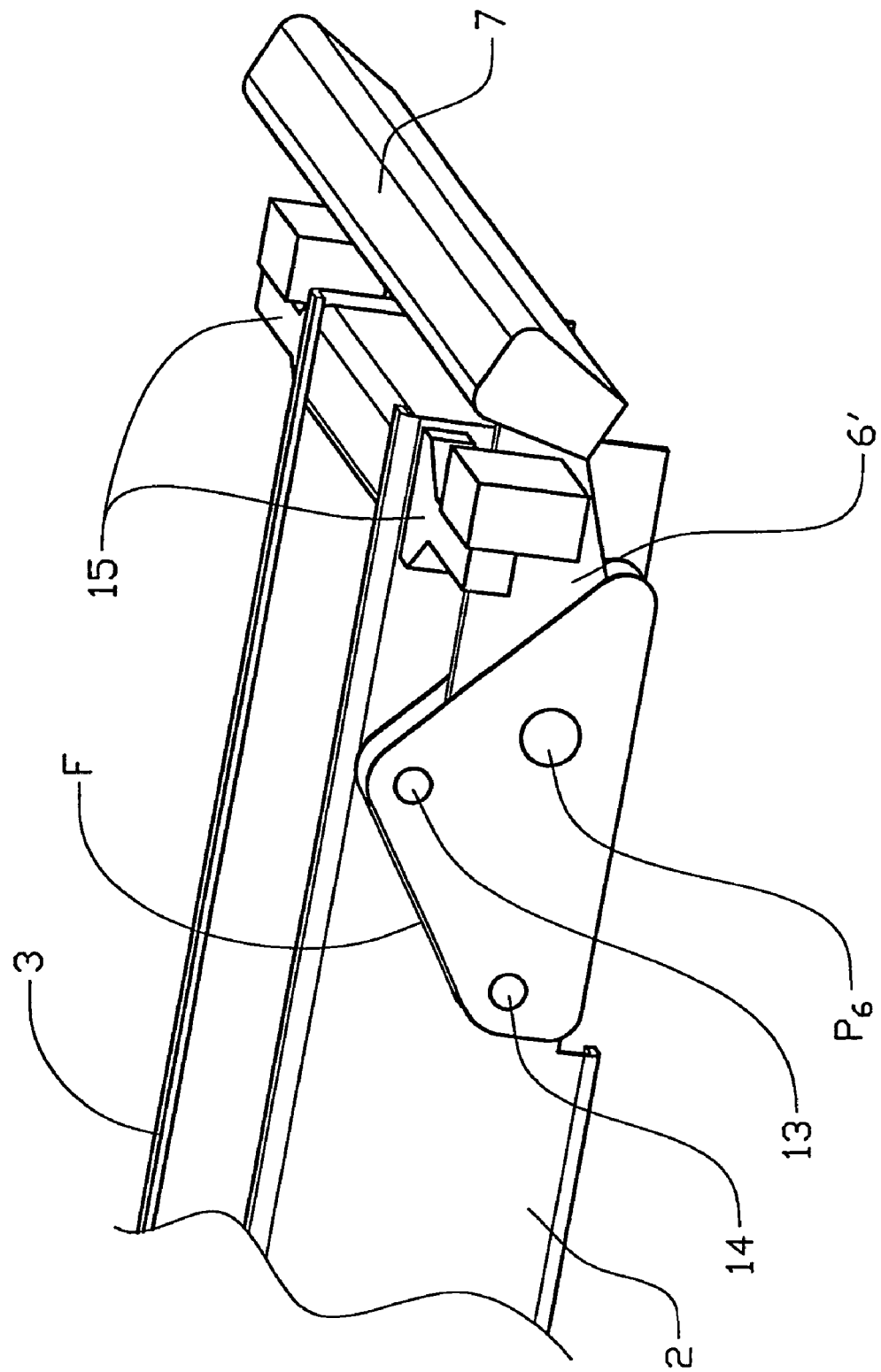
FIG. 7 shows a perspective view of a frame provided with an underrun protection device in an inactive position.

FIG. 7 shows the underrun protection device in a folded up, inactive position. The carriers 6', 6" have been pivoted rearwards and upwards around the pivoting axis $P_6$ to a substantially horizontal position, whereby they have been displaced along the beams 2, 3. This displacement is limited by the length of the guiding slot 12, which is arranged to arrest the movement when the ends of the carriers come into contact with the second blocking device 14. In this way the impact element 7 has been positioned adjacent, but not in contact with, the rear section 4 of the frame 1 and the holders and electric fittings 15 of the rear lights of the vehicle.

Figure 8:
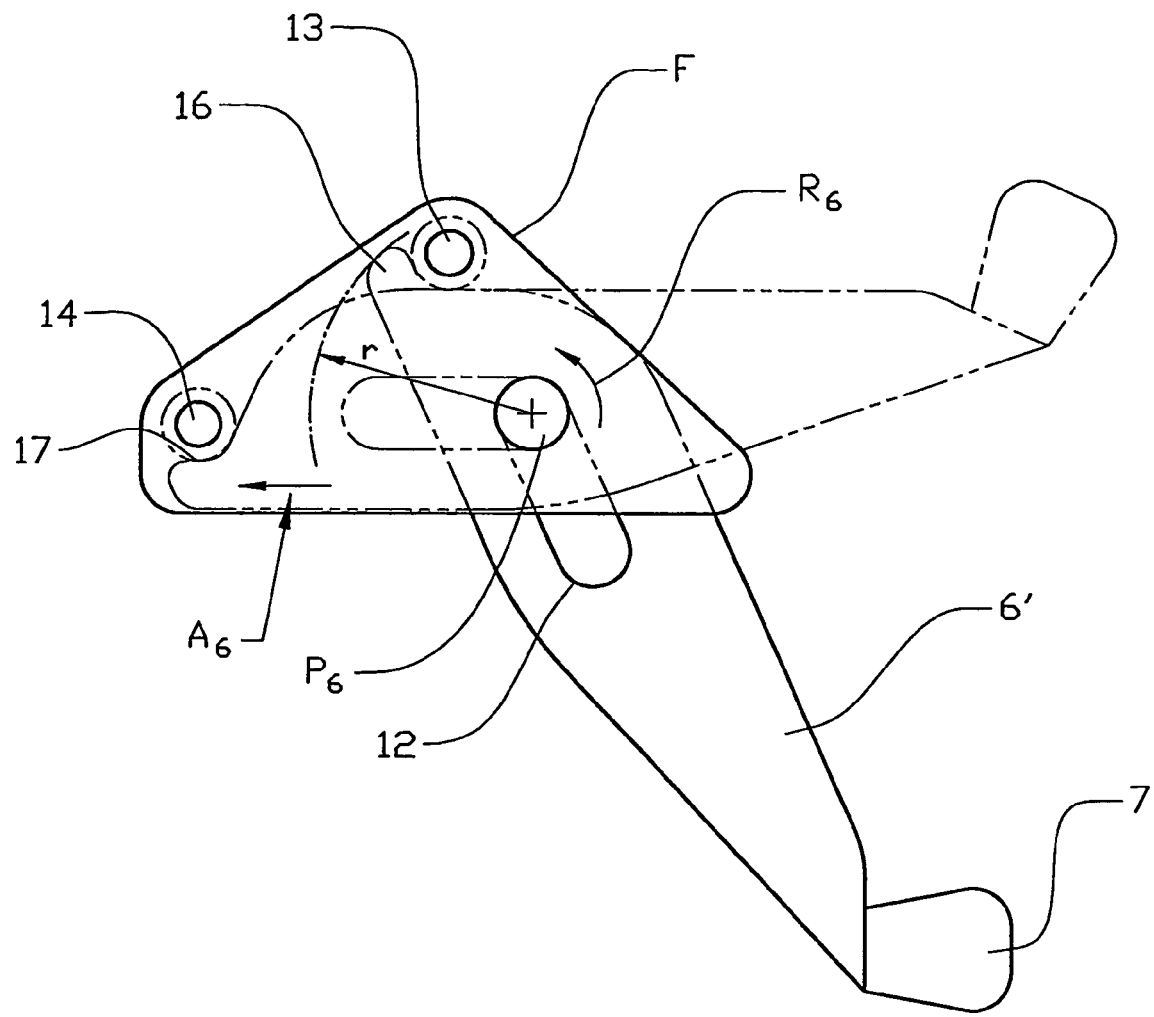
FIG. 8 shows a cross section through an attachment device for an underrun protection device, where both the active and inactive positions are indicated in solid and dashed lines, respectively.

FIG. 8 shows a cross-section through an attachment device F The carrier 6' is shown in its active position, by means of solid lines, and in its inactive position, by means of dashed lines. In its first, from the impact element 7 facing end the carrier is provided with a projection 16 having a substantially upwards facing contact surface 17. This contact surface 17 is in contact with the first blocking device 13 in the the active position. When the carrier 6' is pivoted to its horizontal position the projection 16 is moved along a curve that is described by the radius r, whereby it bypasses the second blocking device 14. The carrier 6' is then displaced substantially horizontally forwards, whereby the guiding slot 12 is displaced along its entire length relative to the pivoting axis $P_6$. At the same time as the end of the guiding slot 12 reaches the pivoting axis $P_6$, the contact surface 17 of the projection 16 will come into contact with the second blocking device 14. The carrier 6' is then locked in its inactive position.

Figure 9:
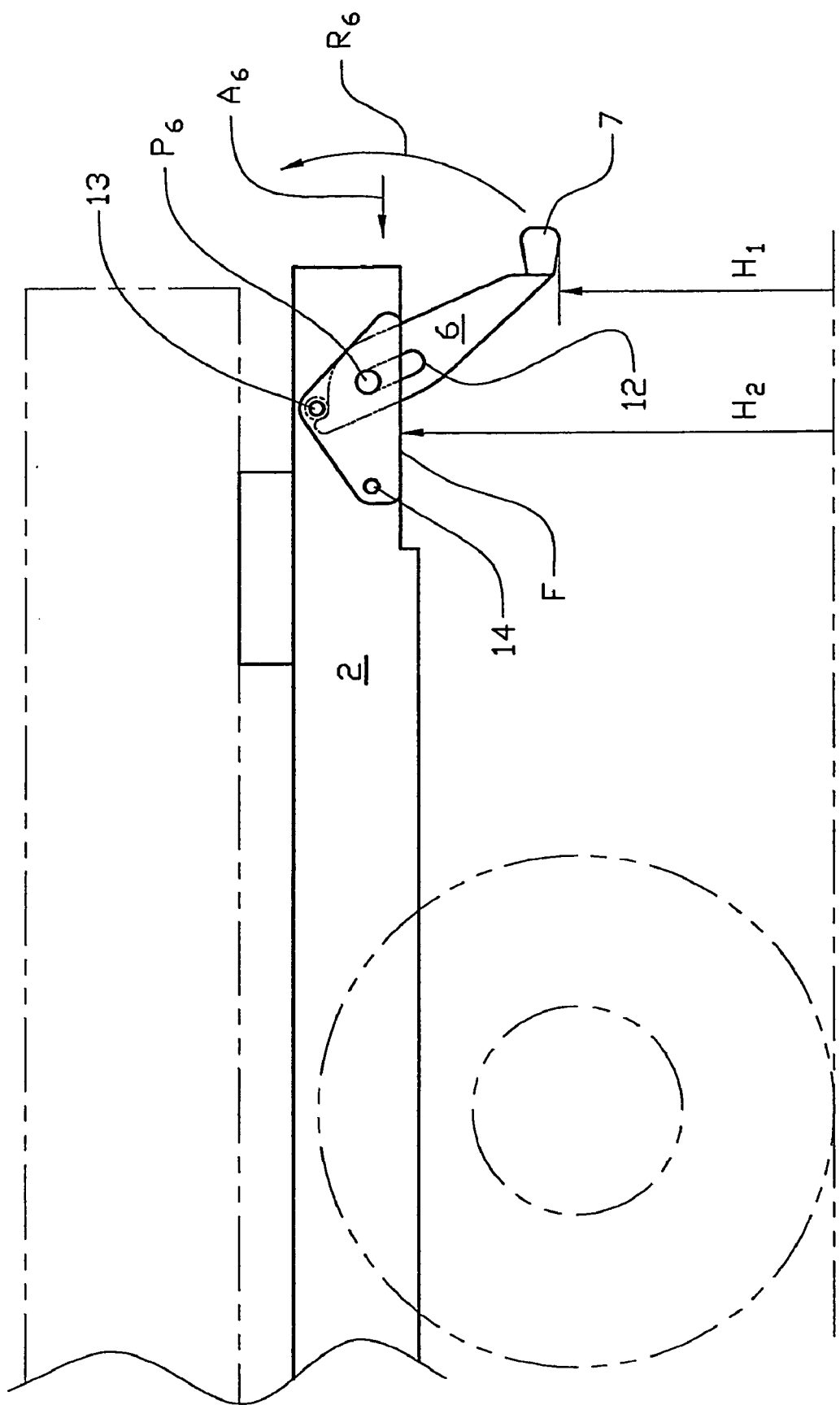
FIG. 9 shows a side view of a frame vehicle provided with an underrun protection device configured according to the present invention.

FIG. 9 shows a folded down underrun protection device mounted on a schematically illustrated vehicle. The difference in road clearance is shown in the figure, where the height $H_1$ represents the active position of the device and the height $H_2$ represents the inactive, folded position.

Figure 10:
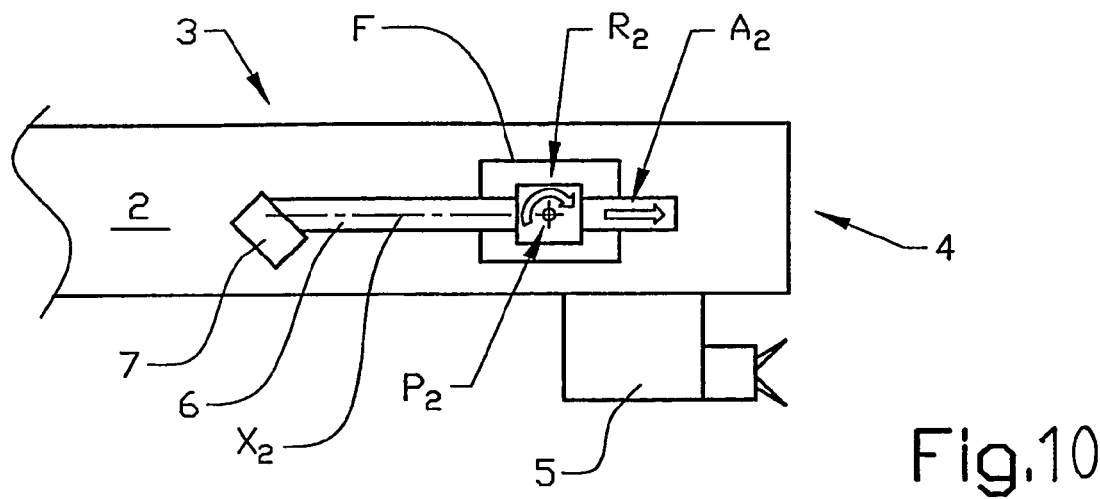
FIG. 10 shows a side view of a further embodiment configured according to the present invention, with an underrun protection device placed in an inactive position.

FIG. 10 shows a further embodiment of the invention, which allows the underrun protection device to be folded to an alternative, second inactive position. The main function for folding the carriers 6 has been described in connection with FIG. 3 above. As shown in FIG. 10 the difference between this further embodiment and the previously described embodiments is that the carriers 6 can be folded away to a substantially horizontal position in such a way that the impact elements may also be positioned along the beams 2, 3 of the frame.

Figure 11:
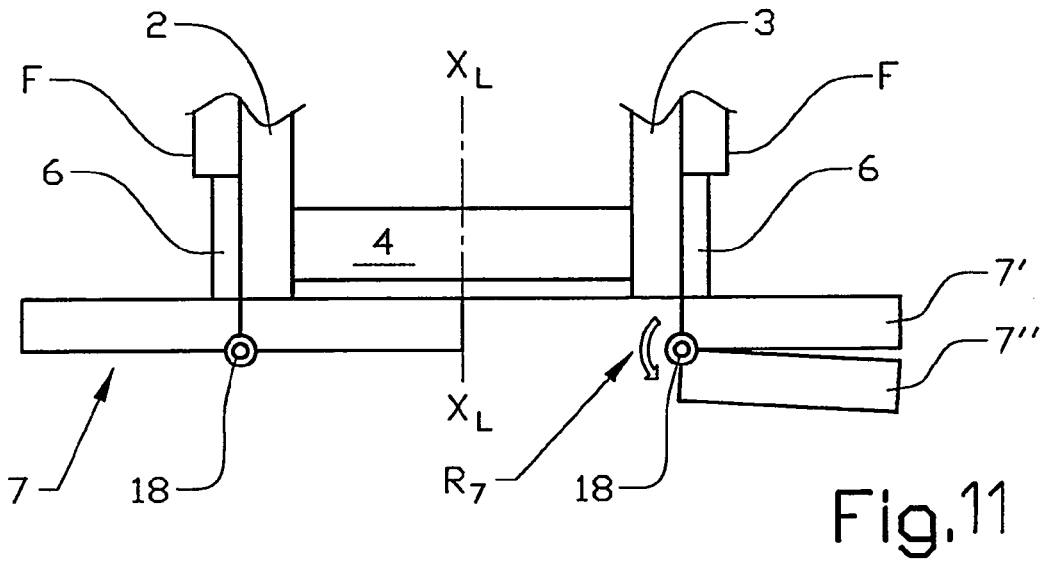
FIG. 11 shows a plan view of a first embodiment of a divided impact element according to the invention.
Figure 12:
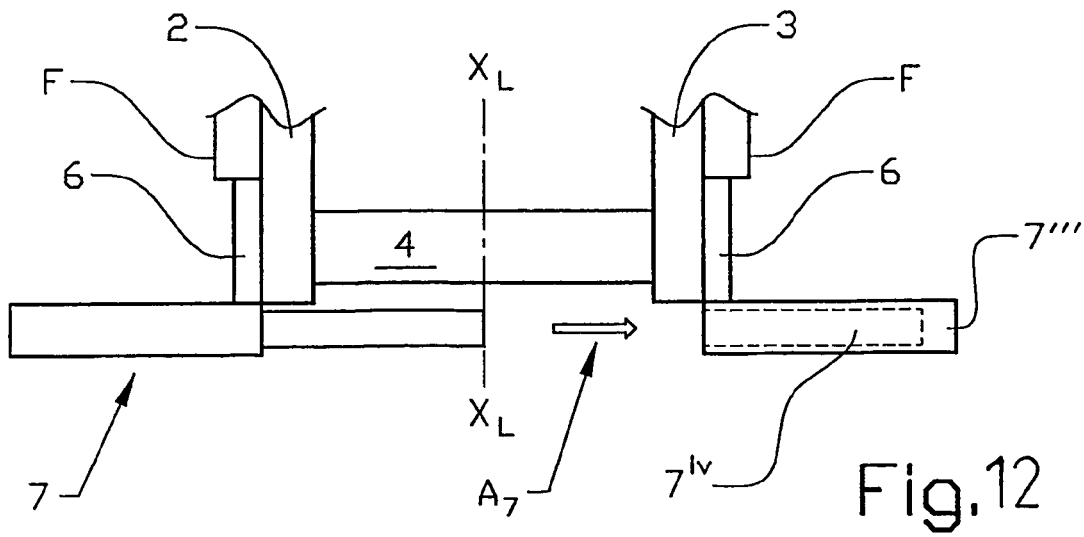
FIG. 12 shows a plan view of a second embodiment of a divided impact element according to the invention.

FIGS. 11 and 12 show plan views of two different embodiments of a divisible impact element. FIG. 12 shows a first embodiment where the transverse impact element 7 can be divided in two sections at a point that coincides with the central longitudinal axis $X_L$ of the vehicle. Each section comprises an outer and an inner section 7' and 7" respectively, relative to the longitudinal axis $X_L$. The two sections are connected via a vertically mounted joint 18 in the form of a hinge. Before the carriers are folded to their inactive positions, a catch (not shown) between the two sections of the impact element is released, whereby the inner section 7" can be folded in the direction indicated by the arrow $R_7$. The inner section 7" is pivoted until it reaches a position substantially parallel to the outer section 7'. In this position both sections 7', 7" of the impact element and the joint 18 are positioned adjacent, but not in contact with, a plane coinciding with the outer side surfaces of the beams 2, 3. The two sections 7', 7" are held together by a suitable locking device during folding to the inactive position.

As the parts of the sections are folded when the impact element is in its folded down position, the vertical axis may also be placed so that the inner section is pivoted around it in the opposite direction, alternatively around a horizontal axis.

FIG. 11 shows a second embodiment where the transverse embodiment 7 is divisible in two sections at a point that coincides with the central longitudinal axis $X_L$. Each section comprises an outer and an inner section 7', 7" respectively, relative to the longitudinal axis $X_L$. The two sections are arranged to be telescopically displaceable relative to each other, in that the cross-section of the inner section is smaller than that of the outer section.

The profile of the inner section 7" should have an outer profile that is substantially identical to the profile of the outer section 7'''. As stated above both sections 7', 7" of the impact element have their inner end surfaces positioned adjacent, but not in contact with, a plane coinciding with the outer side surfaces of the beams 2, 3. Similarly, the two sections 7', 7" are held together by a suitable locking device during folding to the inactive position.

The FIGS. 10-12 have been described in relation to the embodiment of FIG. 3, but the solution may advantageously be applied to all embodiments described above.

In the above examples, the folding of the underrun protection device has as a rule been described when folding from an active to an inactive position. In order to resume the active position, the movements are performed in reverse order. The above embodiments are mainly intended to illustrate the function of the different guides and mechanisms. In practice, several embodiments would require one or more stop pins or stop bolts to control the direction of movement of the various parts. This is particularly true for manually folded devices, which require that the carriers can be locked in at least their end positions.

The above embodiments primarily relate to underrun protection devices for the rear part of the vehicle. The problem of reduced road clearance may also occur at the front of the vehicle, which is also provided with an underrun protection device in some form. Hence it is also possible to apply the invention to the front of the vehicle.

In all the above examples the folding of the carrier may be done manually or by means of some form of actuator. Considering that an underrun protection device of this type may be relatively heavy and difficult to handle for one person, an actuator may be used for moving them between the first, active position to the second, inactive position. The actuators may be electrical, hydraulic or pneumatic, depending on what or which sources of power are available in the vehicle. Control can be achieved by control devices on the outside of the vehicle or by means of a switch on the dashboard.

In most embodiments the actuator is preferably pivotably connected to the frame at a first end, and pivotably connected to a carrier at a second, opposite end. Embodiments allowing simultaneous rotation and displacement may in certain cases be provided with an actuator fixedly mounted to the frame. One such example is a modification of the device of FIG. 3, where a fixed, horizontally mounted hydraulic or pneumatic cylinder attached to the first end 6a of the carrier can achieve the desired folding movement, by displacing the carrier 6 relative to the holder 10 under continuous rotation around the pivoting axis $P_2$. It is possible to place an actuator on both sides of the frame for simultaneous or individual maneuvering of the carriers.

Alternatively an actuator may be placed on one side of the frame, or between the beams, in order to maneuver both carriers simultaneously.

This type of actuator also makes it possible to position and lock the carriers and their impact element in at least one active position and at least one inactive position, respectively. In the first case the road clearance of the impact element can be adjusted to current legislation in different countries. In the latter case a number of inactive positions allows the impact element to be folded only to the extent required for different situations.

The actuators may also be arranged to move the carriers automatically from the first, active position and the second, inactive position when certain predetermined conditions are met. One such condition may be that a tilting function on a vehicle provided with a flak is actuated. The underrun protection device may then be folded away so that it does not form an obstruction or is damaged when unloading soil filling or rocks, or if a sensor or transponder senses that the vehicle is reversing towards a loading bay or a trailer, in order to connect this and the tractor vehicle.

In a corresponding way, the actuators may be arranged to move the carriers automatically from the second, inactive position and the first, active position when certain predetermined conditions are met. One such condition may be that the speed of the vehicle exceeds a predetermined value. In order to avoid an actuation of the active position when a set speed is exceeded temporarily, this condition can be combined with a second condition including a period of time. Automatic actuation will then only occur if a predetermined value for speed is exceeded for a predetermined period of time, alternatively if a second, higher speed is exceeded. It may for instance be assumed that the underrun protection device should be actuated if the speed of the vehicle has exceeded, say, 30 km/h during 30 seconds, alternatively immediately if the speed of the vehicle exceeds 50 km/h, or if the vehicle has been moving for a period of time exceeding 60 seconds.

Such assumptions can be based on the field of use for the vehicle and can be programmed into a central control unit. Vehicles having multiple fields of use may be provided with a number of different strategies, which can be selected by the driver or automatically dependent on pre-set adjustments of the vehicle when changing the field of use. However, the driver should always have the possibility of overriding the system manually.

The invention claimed is:

1. An arrangement for selectively providing underrun protection on a vehicle (1), said arrangement comprising: a frame (1), an impact element arranged on the vehicle at a location corresponding to an expected loading from a force during a possible collision, and at least one displaceable carrier element (6) connecting the frame (1) and the impact element (7), wherein the carrier element is movably and pivotably mounted to an attachment device on the frame and is selectively moveable between at least one first, active position in which the impact element (7) affords underrun protection and at least one second, stowed or inactive position in which the impact element (7) does not afford underrun protection, said carrier element being pivotable relative said attachment device about a pivoting axis to a position intermediate between said first and second positions, and wherein at least a part of the displacement of the carrier element (6) relative to the attachment device between said first and second positions occurs in a direction that substantially coincides with a longitudinal axis (X1, X2, X3, X4, X5, X6) of the carrier element (6) and through said pivoting axis.

2. The arrangement as recited in claim 1, wherein the attachment device comprises at least one first guiding means for guiding the movement of the carrier element (6) and which is arranged to cooperate with at least one cooperating second guiding means of the carrier element (6).

3. The arrangement as recited in claim 2, wherein the first and the second guiding means respectively, comprises at least one guide pin and a guiding slot co-operating with the guide pin.

4. The arrangement as recited in claim 3, wherein the position of the carrier element (6) when the guide pin is located in respective end positions (11*a*, 11*b*) of the guiding slot corresponds to the said first and second positions of the carrier element.

5. The arrangement as recited in claim 2, wherein the attachment device on the frame comprises a third guiding means in the form of the pivoting axis (P1, P2, P3, P4, P6) allowing the carrier element to be pivoted from said first position to the intermediate position, from which intermediate position the carrier element is displaceable along said longitudinal axis (X1, X2, X3, X4, X6) to said second position.

6. The arrangement as recited in claim 5, wherein the first and the second guiding means respectively, comprises a first guiding slot (11) and a guide pin (S3, P4) co-operating with the guiding slot.

7. The arrangement as recited in claim 6, wherein the pivoting axis (P3) co-operates with a farther, fourth guiding means, which comprises a substantially straight, second guiding slot (12) in the carrier element (6).

8. The arrangement as recited in claim 7, wherein the first guiding slot is provided with a first, straight section and a second, curved section having a predetermined continuous curvature.

9. The arrangement as recited in claim 7, wherein the first guiding slot is provided with a first, curved section having a predetermined continuous curvature and a second, straight section.

10. The arrangement as recited in claim 7, wherein the first guiding slot is provided with a first, straight section, a second, curved section having a predetermined continuous curvature and a third, straight section.

11. The arrangement as recited in claim 8, wherein the curved section has a radius (r) corresponding to the distance between the guide pin (S3) and the pivoting axis (S3) when the guide pin is located in said curved section.

12. The arrangement as recited in claim 2, wherein the pivoting axis is provided with a holder (10), whereby the carrier element is displaceably mounted relative to the holder.

13. The arrangement as recited in claim 12, wherein the holder (10) is provided with a pair of opposing, parallel surfaces which constitute said first guide means and which cooperate with corresponding surfaces on the carrier element (6) during displacement of the carrier element, the corresponding surfaces constituting said second guide means.

14. The arrangement as recited in claim 2, wherein the attachment device (F) includes a third guiding means in the form of a pivoting axis that allows the carrier element (6) to pivot, thereby allowing displacement of the carrier element along its longitudinal axis (X1) from said first, active position to the intermediate position and then to said second, inactive position.

15. The arrangement as recited in claim 1, wherein when the carrier element is in said second, inactive position the longitudinal axis of the carrier element substantially corresponds to a longitudinal axis of the frame.

16. The arrangement as recited in claim 15, wherein the impact element (7) is divisible into two sections (7', 7", 7''', 7IV) along a main extension, at a point that coincides with a central longitudinal axis (XL) of the frame.

17. The arrangement as recited in claim 16, wherein each section (7', 7", 7''', 7IV) of the impact element is provided with a further, second dividing point that substantially coincides with a line through the carrier element (6).

18. The arrangement as recited in claim 17, wherein each respective section comprises an inner and an outer section, pivotably attached at the second dividing point, whereby the inner section is pivotable to a position substantially parallel to the outer section.

19. The arrangement as recited in claim 18, wherein the respective inner section is pivoted around a vertical axis (18).

20. The arrangement as recited in claim 17, wherein the respective inner section has a cross-section that is slightly smaller than the corresponding outer section, which allows the inner section to be displaced into the outer section.

21. The arrangement as recited in claim 1, wherein the at least one displaceable carrier element is provided with an actuator for moving the carrier element between the first, active position and the second, inactive position.

22. The arrangement as recited in claim 21, wherein the actuator is electrically, hydraulically, or pneumatically operated.

23. The arrangement as recited in claim 21, wherein the actuator is pivotably connected to the frame (1) at a first end, and is pivotably connected to the carrier (6) at a second, opposite end.

24. The arrangement as recited in claim 21, wherein the actuator is fixedly connected to the frame (1) at a first end, and is pivotably connected to the carrier (6) at a second, opposite end.

25. The arrangement as recited in claim 21, wherein the actuator is arranged to automatically move the carrier element from the first, active position to the second, inactive position when certain predetermined conditions are fulfilled.

26. The arrangement as recited in claim 25, wherein the second, inactive position is at a location to allow activation of a vehicle loading platform.

27. The arrangement as recited in claim 21, wherein the actuator is arranged to automatically move the carrier element from the second, inactive position to the first, active position when at least one predetermined condition is fulfilled.

28. The arrangement as recited in claim 27, wherein the at least one predetermined condition is that the vehicle speed exceeds a predetermined value.

29. The arrangement as recited in claim 27, wherein said at least one predetermined condition is that the vehicle speed has exceeded a predetermined value for a predetermined period of time.

30. The arrangement as recited in claim 1, wherein the carrier element is arranged to be locked in an intermediate position located between the active position and the inactive position.

31. The arrangement as recited in claim 1, wherein the carrier element is arranged to be locked in at least one further inactive position.

32. The arrangement as recited in claim 5, wherein said intermediate position is arranged to be an alternative inactive position in which the impact element (7) does not provide underrun protection.

33. The arrangement as recited in claim 1 wherein said carrier element is pivotable relative said attachment device about said pivoting axis from said first position to said intermediate position and from said intermediate position the carrier element is displaceable along said longitudinal axis (X1, X2, X3, X4, X6) and through said pivoting axis to said second position.

* * * * *